R. VOSE & J. W. EVANS.
Improvement in Clothes-Wringers.
No. 132,782. Patented Nov. 5, 1872.
Fig 1.
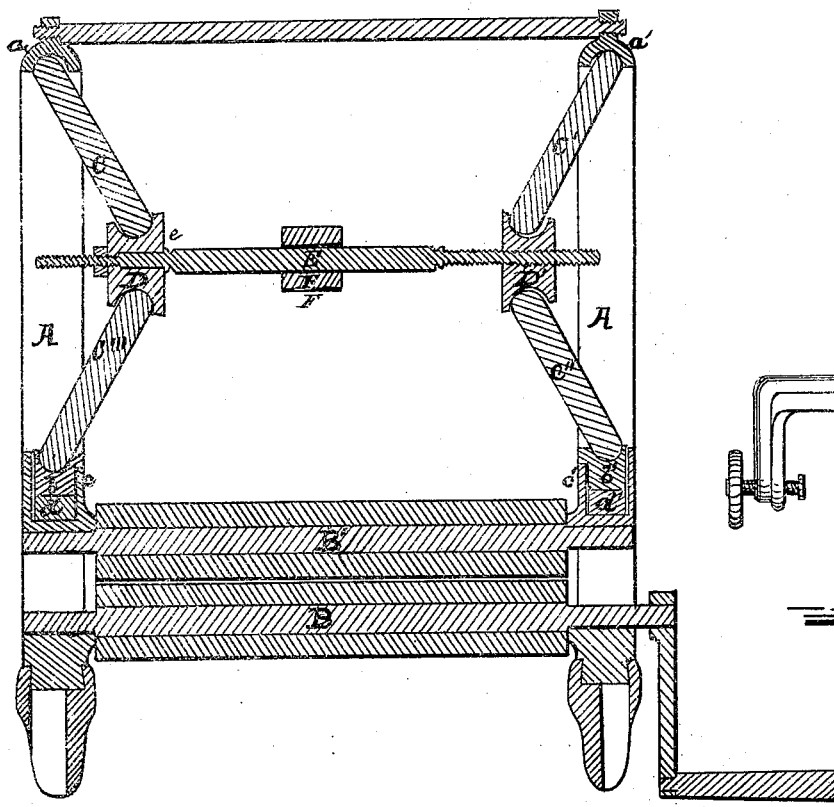
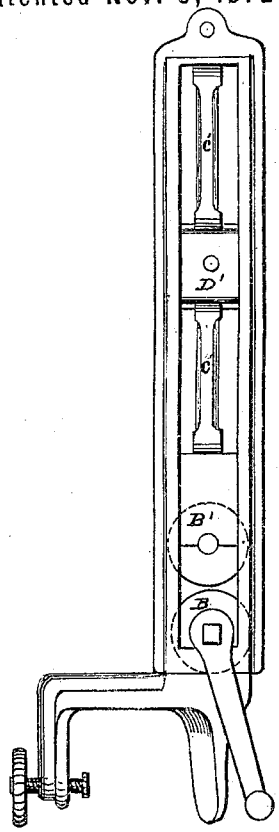
Fig 2.

UNITED STATES PATENT OFFICE.

RICHARD VOSE AND JAMES W. EVANS, OF NEW YORK, N. Y.

IMPROVEMENT IN CLOTHES-WRINGERS.

Specification forming part of Letters Patent No. 132,782, dated November 5, 1872.

*To all whom it may concern:*

Be it known that we, RICHARD VOSE and JAMES W. EVANS, jointly, both of the city, county, and State of New York, have invented certain Improvements in Clothes-Wringers, of which the following is a specification:

Our invention relates to the combination, with the rollers in a clothes-wringing machine, of two toggle-joint levers, one acting at each end of the rolls, whereby, by the movement of a single screw, pressure is applied to both ends of the rolls simultaneously.

Figure 1 is a vertical central section of a clothes-wringing machine embodying our invention, and Fig. 2 is a side elevation of the same.

A is the frame of the machine, which may be made either of iron or wood. B and B' are India-rubber rollers, mounted on suitable iron axles, of the ordinary construction, revolving in suitable bearings in the frame. $c$ $c'$ $c''$ $c'''$ are bars which, with the center pivot-blocks D and D', constitute two toggle-joint levers, placed in recesses in the sides of the frame A, the upper ends abutting against bearings $a$ $a'$ in the top of the frame, and the lower ends against blocks $b$ $b'$ placed upon or within recesses in bearings $c$ $c'$ that rest upon the journal of the upper roller B. $d$ and $d'$ are pieces of India rubber placed between the blocks $b$ $b'$ and the bearings $c$ $c'$, which it is desirable to use in order to render the upper roller somewhat yielding. E is an iron rod, the ends passing through holes in the pivot-blocks D and D', one end having a shoulder, $e$, resting against the inner surface of the block D, and secured in the block by a nut on the opposite side, permitting the rod to revolve in the block, but not to move endwise. Upon the opposite end a screw is cut that works in a corresponding screw-thread in the block D'. F is a handle to be grasped by the hand in revolving the rod.

By revolving the rod E so as to run the screw into the block D' the blocks are drawn together and the levers shortened, and by revolving the rod in the opposite direction the levers are lengthened, and pressure is applied to the roller B.

As is evident, this combination of devices furnishes a very convenient means of readily setting down, with any required degree of pressure, the upper roller upon the lower, both ends being forced down simultaneously.

What we claim as new is—

The combination, in a clothes-wringing machine, of the toggle-joint levers described, and the rod E with the roller B, substantially as and for purpose described.

RICHD. VOSE.
      JAMES W. EVANS.

Witnesses:
 R. R. WOOD,
 W. A. SHELDON.